United States Patent
von Pickartz

[11] Patent Number: 5,115,787
[45] Date of Patent: May 26, 1992

[54] SPARK IGNITION COMBUSTION ENGINE OF THE FUEL INJECTION TYPE AND HEATING ELEMENT THEREFOR

[75] Inventor: Rikus von Pickartz, Al Borne, Netherlands

[73] Assignee: Texas Instruments Incorporated, Dallas, Tex.

[21] Appl. No.: 764,580

[22] Filed: Sep. 24, 1991

[51] Int. Cl.$^5$ .............................................. F02M 31/00
[52] U.S. Cl. .................................... 123/549; 123/552; 123/546; 219/505; 219/552
[58] Field of Search ............... 123/549, 546, 543, 552, 123/557, 547; 219/505, 552, 541; 392/341

[56] References Cited

U.S. PATENT DOCUMENTS

| | | | |
|---|---|---|---|
| 4,366,798 | 1/1983 | Goto et al. | 123/549 |
| 4,395,623 | 7/1983 | Shimada et al. | 219/505 |
| 4,489,232 | 12/1984 | Wada et al. | 123/549 |
| 4,716,276 | 12/1987 | Motegi et al. | 219/505 |
| 4,834,053 | 5/1989 | Van Der Ploeg et al. | 123/549 |
| 4,967,706 | 11/1990 | Van Wechem et al. | 123/549 |
| 5,056,495 | 10/1991 | Yamashita et al. | 123/549 |

Primary Examiner—E. Rollins Cross
Assistant Examiner—M. Macy
Attorney, Agent, or Firm—Russell E. Baumann; Richard L. Donaldson; René E. Grossman

[57] ABSTRACT

A spark ignition combustion engine has a cylinder, an air inlet duct, a fuel injector, and a cylinder head having an inlet valve and a passage arranged to form and furnish an air-fuel mixture to the cylinder through the passage and has a heating element including a heat sink in the form of a hollow flat metal box having an integral connecting piece arranged with the connecting piece sealed in an opening in a wall of the duct or passage by a circumferential O-ring so that the flat metal box of the heat sink protrudes into the duct or passage to heat the air-fuel mixture. Two tablets of PTC resistance material are disposed within the flat metal box and are pressed resiliently against respective flat opposite inner sides of the box by a conductive spring disposed between the tablets, and an electrical wire leads from the spring through the connecting piece to connect the tablets to an electrical power source.

6 Claims, 2 Drawing Sheets

SPARK IGNITION COMBUSTION ENGINE OF THE FUEL INJECTION TYPE AND HEATING ELEMENT THEREFOR

BACKGROUND OF THE INVENTION

The field of the invention relates in first instance to an injection combustion engine with electric spark ignition comprising at least one cylinder having an air inlet duct, at least one inlet valve disposed in a cylinder head, at least one fuel injector, and a heating element with a heat sink disposed downstream of the injector having one or more PTC tablets thereon.

A combustion engine of this type is know from German Patent DE-C-3,426,469 and Dutch Patent NL-A-8,801,334.

It appears that about 50% of the total exhaust gas pollution emission from operation of an engine is formed in the brief period before the engine reaches its operating temperature. Even exhaust gas catalysts, which under normal conditions reduce the exhaust gas pollution emission by about 90%, achieve this degree of conversion only when the operating temperature of the catalyst is reached. The conversion begins at a temperature of about 300° C. so that at first after a cold start the exhaust gas pollution emission of the engine with a catalyst is reduced little or not at all. Since the temperature level is not high enough to fully vaporize the fuel (gasoline or alcohol) in a cold engine, an extra amount of fuel has to be added to the cold engine in order to obtain a combustible mixture. This leads to a high exhaust gas pollution emission. At low engine temperatures, therefore, both fuel consumption and exhaust gas pollution emission tend to be relatively high. The heating of the fuel/air mixture by the heating element therefore makes a substantial contribution to improving environmental quality and at the same time leads to a substantial saving in fuel, inasmuch as little or no extra fuel needs to be injected. In the combustion engine described above, the fuel is sprayed onto a heating element which has been quickly brought to the desired temperature and the fuel is thus brought to the desired temperature. The fuel will vaporize better and at the same time a better mixture with the combustion air will be obtained. The heating element is disconnected when the engine is hot enough to take over the vaporization of the fuel.

In the engine known from the said German Patent DE-C-3,426,649, the heating element is made in the form of a pipe projecting into the inlet duct of the cylinder and surrounded by an insulating tube. The pipe and the tube have a border flange fitting in a recess in the cylinder head and fixed by the air inlet duct. One drawback of this design is that installation and replacement of the heating element is a time-consuming chore. A similar drawback is found in the engine according to Dutch Patent NL-A-8,801,334 where the heating element is integrated in a plate clamped between the inlet duct and the heat of the cylinder.

BRIEF SUMMARY OF THE INVENTION

It is an object of the present invention to eliminate the above-noted drawbacks and to create an engine of the general type described in the introduction in which the heating element can be easily installed and replaced and where, in the case of a multicylinder engine the heating elements in each individual cylinder can be replaced separately. Another objective of the invention is to improve the transfer of heat from the heat sink to the fuel.

According to the invention, the previously known injection combustion engine described above is characterized by the fact that the heating element is disposed through an opening in the wall of the cylinder head or of the air inlet duct in such a way that the heat sink protrudes into the fuel mixture inlet duct.

In order to achieve excellent heating efficiency according to the present invention without substantially increasing the flow resistance of the air current, the heat sink is preferably provided with one or more fins which extend approximately parallel to the inlet air flow and at a selected, preferably limited angle relative to the inlet fuel flow.

The heating element is simple and inexpensive to make in an automated process, and easy to mount in the heat sink which consists of a hollow, flat metal box that forms a unit (monolith) with an integral connection piece in which a groove is cut and in which an O-ring is placed as a seal either to the wall of the cylinder head or, where the case applies, to the air inlet duct.

The PTC tablets are preferably resiliently engaged or pressed by a spring against two opposing inner surfaces of the hollow, flat box, and the spring is connected with an electrical contact wire.

The invention is outstandingly suitable for an injection engine with two inlet valves per cylinder having a partition dividing the inlet duct for the fuel into two halves which open on the respective inlet valves. With such an engine in the cold state there is the risk that the fuel will condense on the cold partition. This risk is preferably avoided according to the invention by placing the heat sink in or aligned with the profile of the partition just before that partition.

The invention also comprises a heating element for the injection combustion engine comprising a heat sink in the form of a hollow flat box, a connecting piece forming an integral unit therewith, a spring means disposed in the flat box that resiliently engages or presses against two PTC tablets and presses the tablets against two opposing inner side surfaces of the box, and an electrical contact wire connected with the spring means which extends from the heating element through the connecting piece. On the outside of the heat sink one or more fins are formed and the connecting piece has a groove running around the circumference of the piece in a plane disposed obliquely to the centerline of the connecting piece to receive an O-ring. This minimizes accumulation of the fuel from the gap.

The invention will now be described in more detail with the aid of the figures.

DESCRIPTION OF THE DRAWINGS

Other objects, advantages and details of the engine and heating element of the invention appear in the following detailed description of the preferred embodiments of the invention, the detailed description referring to the drawings in which.

DESCRIPTION OF THE PREFERRED EMBODIMENTS

Figure 1:
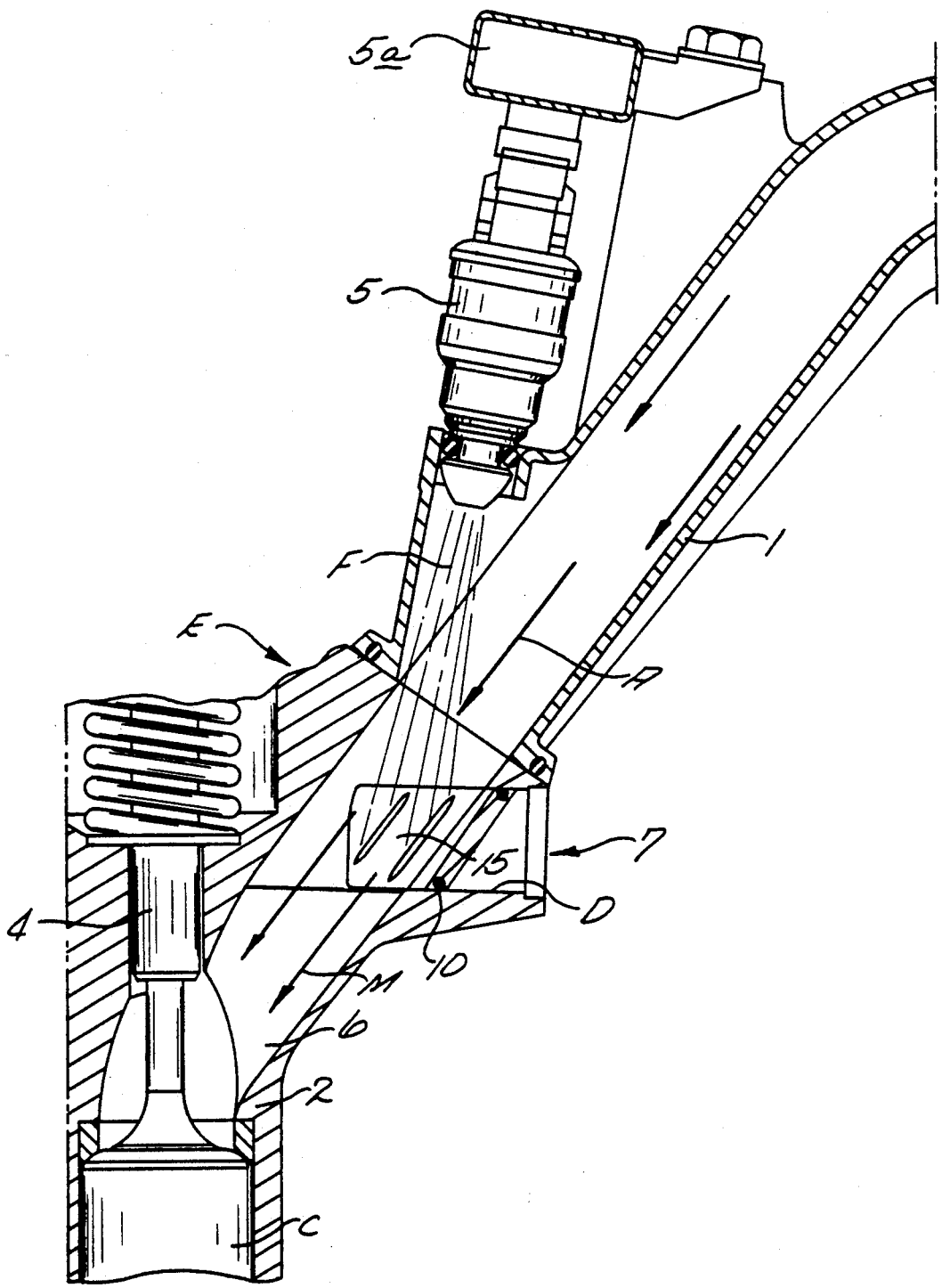
FIG. 1 shows a cross section of a part of a combustion engine according to the invention.

The portion of a spark ignition combustion engine E of the fuel injection type shown in FIG. 1 comprises an air inlet duct 1 for furnishing air A, attached to a cylinder head 2 in such a way that it connects with a passage 3 for the introduction into the cylinder C of an air/fuel mixture M through two inlet valves 4 mounted on the cylinder head (only one valve being shown in FIG. 1).

On the air inlet duct 1 there is a fuel injector 5 connected to a fuel feed duct 5a for furnishing fuel F to the cylinder C by fuel injection.

Figure 2:
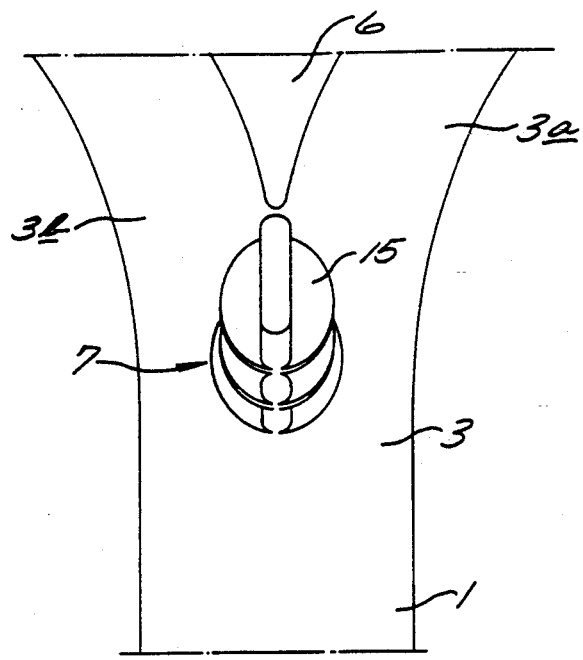
FIG. 2 shows a diagrammatic overhead view of the heating element and the dividing partition in the air/fuel mixing duct, in which the inner surface of the inlet ducts for air and fuel are indicated by a simple line.

As best shown in FIG. 2, in duct 3 there is a cast-in partition 6 which, as shown in FIG. 2, runs upstream in a wedge shape and divides duct 3 into two partial ducts 3a, 3b. In order to bring the fuel to the desired temperature for a cold engine, the fuel, on injection, is sprayed onto a heating element 7. This heating element 7 protrudes through an opening D in the cylinder head into duct 3. The element is secured or retained in the opening by a press fit or other conventional means. It is not excluded that the heating element 7 protrudes through an opening in the inlet duct 2, at a point between the fuel injector and cylinder such that the injected fuel comes in contact with element 7.

The heating element 7 comprises a metal heat sink 8 in the form of a hollow, flat metal box of thermally and electrically conducting material placed in the passage 3, aligned with the profile of partition 6 just ahead of the upstream end thereof.

The heat sink 8 forms an integral unit with a connecting piece 9 that has an oblique groove 9a extending around the circumference of the connecting piece to receive an O-ring gasket 10 to seal the connecting piece relative to the wall of the cylinder head opening D through which the heating element is placed. In the hollow flat metal box of the heat sink 8 there are two tablets 11a, 11b facing each other and made of a ceramic electrical resistance material or the like with a positive temperature coefficient (PTC). The tablets are resiliently pressed against respective inner side surfaces of the hollow flat metal box by an electrically conductive spring 12 disposed between the tablets.

Figure 3:
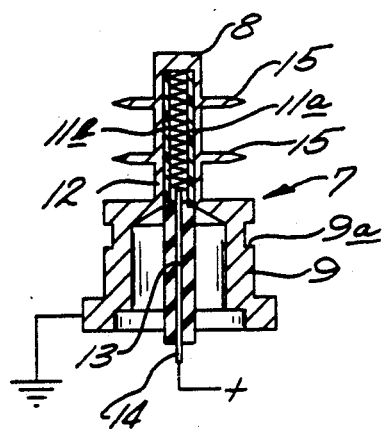
FIG. 3 shows the heating element according to the invention in cross section.
Figure 4:
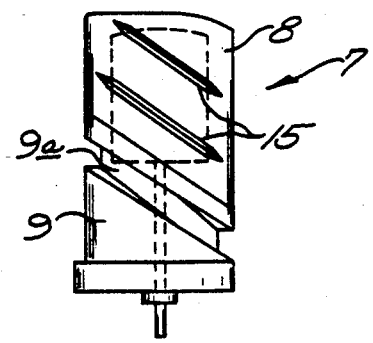
FIG. 4 is a side elevation of the heating element.

The spring 12 is connected with an insulated electric lead wire 13 which extends through the connecting piece and has a connecting pin end 14. It will be understood that when electric current is supplied from a power source to spring 12 via the wire 13 as is diagrammatically indicated in FIG. 3, the PTC tablets are connected in an electrical circuit and are electrically energized and heated, and, the PTC material is selected so that, as the temperature rises, the resistance of the PTC material will increase so that the temperature of the tablets self-regulates in a known manner and cannot rise above a predetermined maximum.

On the outside of the flat heat sink box, the oblique fins 15 are cast or otherwise formed, as shown in FIG. 1. The fins are adapted to fit through the opening D and, in the assembled state of the heating element in the engine, run generally parallel to the airflow direction indicated by arrows A and M. The direction of feed of the injected fuel F, however, is arranged to strike somewhat obliquely relatively to the fins 15 so that the fuel is sprayed onto the fins. This insures that the heat transfer from the heat sink to the fuel will take place very efficiently without appreciably increasing the resistance relative to the airflow to the cylinder.

Further advantages of the construction described are that the heating element is simple and inexpensive to make and can be installed and replaced individually with utmost simplicity by snap or pressure fit into the opening D.

Within the scope of the invention a number of variations are possible. The invention is also applicable to an engine with one inlet valve per cylinder, but is especially advantageous for an engine with two inlet valves per cylinder.

We claim:

1. A spark ignition combustion engine of the fuel injector type comprising at least one cylinder, an inlet duct for air, a fuel injector furnishing fuel to be mixed with the air to form an air-fuel mixture, a cylinder head having a passage leading from the air inlet duct to the cylinder, at least one inlet valve disposed on the cylinder head regulating flow of the air-fuel mixture to the cylinder, and a heating element having a heat sink with at least one tablet of electrical resistance material of positive temperature coefficient of resistivity thereon, the heating element being disposed in an opening in a wall of the air inlet duct or cylinder head passage between the fuel injector and the cylinder so that the heat sink thereof protrudes into the flow of the air-fuel mixture to the cylinder, characterized in that the heat sink comprises a hollow flat metal box having an integral connecting piece and has a groove formed in the connecting piece around the circumference thereof, the connecting piece being disposed in the wall opening and having an O-ring gasket means disposed in the groove sealing the opening.

2. A spark ignition combustion engine according to claim 1 further characterized in that two of said tablets are disposed within the hollow flat metal box, electrically conductive spring means disposed between the tablets resiliently press the tablets against respective inner sides of the hollow flat metal box, and an electrical wire electrically connected to the spring means extends from the heating element through the connecting piece.

3. A spark ignition combustion engine according to claim 1 wherein the groove extending around the circumference of the connecting piece is disposed in a flame extending obliquely relative to a central axis of the connecting piece.

4. A heating element for a spark ignition combustion engine comprising a heat sink in the form of a hollow flat metal box having an integral connecting piece, two tablets of electrical resistance material of positive temperature coefficient of resistivity disposed within the hollow flat metal box, electrically conductive spring means disposed between the tablets resiliently pressing the tablets against respective flat inner sides of the hollow/flat metal box, and an electrical wire electrically connected to the spring means extends from the heating element through the connecting piece.

5. A heating element according to claim 4 wherein the connecting piece is provided with a groove extending circumferentially around the connecting piece for receiving O-ring gasket means to permit sealing of the connecting piece in an opening while permitting the box to protrude from the opening into an air fuel flow passage.

6. A heating element according to claim 5 wherein the groove extending around the circumference of the connecting piece is disposed in a plane extending obliquely relative to a central axis of the connecting piece.

* * * * *